(12) United States Patent
Wei

(10) Patent No.: US 10,399,794 B1
(45) Date of Patent: Sep. 3, 2019

(54) SPACE SEPARATOR FOR A SORTING ROBOT

(71) Applicants: Beijing Jingdong Shangke Information Technology Co., Ltd., Beijing (CN); JD.com American Technologies Corporation, Santa Clara, CA (US)

(72) Inventor: Zihang Wei, Santa Clara, CA (US)

(73) Assignees: Beijing Jingdong Shangke Information Technology Co, Beijing (CN); JD.com American Technologies Corporation, Santa Clara, CA (US)

( * ) Notice: Subject to any disclaimer, the term of this patent is extended or adjusted under 35 U.S.C. 154(b) by 0 days.

(21) Appl. No.: 15/911,532

(22) Filed: Mar. 5, 2018

(51) Int. Cl.
| | |
|---|---|
| *B65G 47/26* | (2006.01) |
| *B65G 47/08* | (2006.01) |
| *B65G 47/24* | (2006.01) |
| *B65G 43/08* | (2006.01) |

(52) U.S. Cl.
CPC ......... *B65G 47/261* (2013.01); *B65G 47/088* (2013.01); *B65G 47/24* (2013.01); *B65G 43/08* (2013.01)

(58) Field of Classification Search
CPC .................................................... A01K 1/0114
USPC .......................... 209/259, 324; 119/166, 165
See application file for complete search history.

(56) References Cited

PUBLICATIONS

WWW.bakersupplies.pk/Flour-Sifter-Large Advert from Baker Supplies (Year: 2018).*

\* cited by examiner

*Primary Examiner* — Gene O Crawford
*Assistant Examiner* — Lester Ill Rushin
(74) *Attorney, Agent, or Firm* — Dinsmore & Shohl, LLP

(57) ABSTRACT

The present disclosure discloses a space separator for a sorting robot. A preferred embodiment of the space separator may comprise: at least one layer of trays, an axial center of the tray being provided with a shaft, the tray being provided with a slot in which an openable tray door is provided, an end of the tray extending upwards to form a tray wall; wherein the space separator is disposed along the shaft of the tray till the tray wall, the space separator being rotatable about the shaft of the tray. This embodiment enables a flexible adjustment of the number and size of the storage bins divided on the tray with the space separator.

10 Claims, 4 Drawing Sheets

SPACE SEPARATOR FOR A SORTING ROBOT

TECHNICAL FIELD

The present application relates to the technical field of fulfillment, specifically to the technical field of warehouse fulfillment, and more particularly to a space separator for a sorting robot.

BACKGROUND

In a warehouse, products in customer orders are usually retrieved and transported with typical trays placed on a trailer. However, these traditional trays are limited by the number of items, the size of each storage bin, response time of a worker, and human-caused mismatching, such that upon each sorting, the size of the storage bin would limit the number of items stored in the storage bin.

SUMMARY

The present disclosure provides a space separator for a sorting robot.

An embodiment of the present disclosure provides a space separator for a sorting robot, wherein the sorting robot comprises: at least one layer of trays, an axial center of the tray being provided with a shaft, the tray being provided with a slot in which an openable tray door is provided, an end of the tray extending upwards to form a tray wall; and the space separator is disposed along the shaft of the tray till the tray wall, the space separator being rotatable about the shaft of the tray.

In some embodiments, the space separator comprises a frame in which a soft material and/or a hard material is laid.

In some embodiments, a top part of the frame is provided with a transverse beam; on the transverse beam is provided a driving motor; a gearwheel is provided on the shaft of the driving motor; when the shaft of the driving motor drives the gearwheel to rotate, the gearwheel is engaged with a gear ring preset on the tray wall to drive the space separator to rotate about the shaft of the tray.

In some embodiments, the transverse beam is detachably connected to a sliding beam; on the sliding beam is mounted a driving motor.

In some embodiments, the sliding beam is detachably connected to a motor base of the driving motor, and the motor base being adjustable according to a predetermined size along a vertical direction.

In some embodiments, the space separator is provided with a mounting ring that is sleeved on the shaft of the tray.

In some embodiments, the space separator is provided with a detachable mounting ring.

In some embodiments, the space separator is provided in plurality, wherein positions of the mounting rings of the space separators are determined based on the positions where the mounting rings of the plurality of space separators are stacked on the shaft of the tray.

In some embodiments, the number of the space separators is determined based on the number of storage bins divided by the space separators in the tray; and/or sizes of the storage bins divided by the plurality of space separators in the tray are determined based on relative positions of the plurality of space separators.

The space separator for a sorting robot provided by the embodiments of the present disclosure enables adjustment of the volume of a storage bin and the number of items placed in the storage bin, wherein the sorting robot comprises: at least one layer of trays, an axial center of the tray being provided with a shaft, the tray being provided with a slot in which an openable tray door is provided, an end of the tray extending upwards to form a tray wall; the space separator is disposed along the shaft of the tray till the tray wall, the space separator being rotatable about the shaft of the tray.

BRIEF DESCRIPTION OF THE DRAWINGS

Other features, objects and advantages of the present disclosure will become more apparent through reading the detailed description of non-limiting embodiments with reference to the accompanying drawings.

DETAILED DESCRIPTION

Hereinafter, the present disclosure will be described in further detail with reference to the accompanying drawings and the embodiments. It will be appreciated that the preferred embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
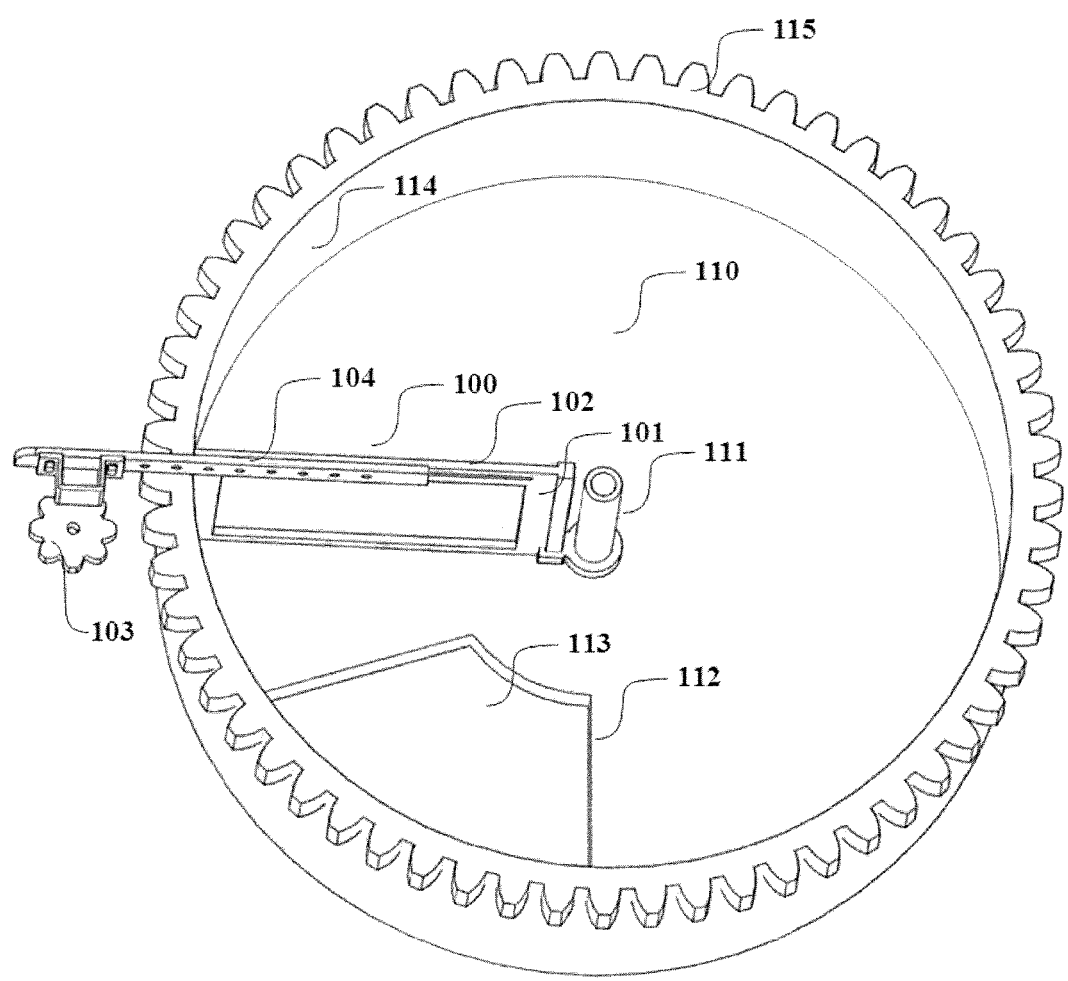
FIG. 1 is an exemplary assembly diagram of an embodiment of a space separator for a sorting robot according to the embodiments of the present disclosure.

Please refer to FIG. 1, which is an exemplary assembly diagram of an embodiment of a space separator for a sorting robot according to the embodiments of the present disclosure.

As illustrated in FIG. 1, a space separator 100 for a sorting robot is provided, wherein the sorting robot comprises: a tray 110, an axial center of the tray 110 being provided with a shaft 111, the tray being provided with a slot 112 in which an openable tray door 113 is provided, an end of the tray extending upwards to form a tray wall 114; the space separator 100 is disposed along the shaft of the tray till the tray wall, the space separator 100 being rotatable about the shaft of the tray In this embodiment, the space separator 100 that is rotatably connected on the shaft 111 of the tray 110 may be integrally or separately designed to implement a function of space partition. An electric motor or other rotation driving device may be employed to drive the space separator 100 to rotate along the shaft 111 of the tray. One or more space separators may be provided here.

Here, in the case that only one space separator 100 is provided, the rotation driving device of the space separator 100 may be disposed on the shaft 111 of the tray to which the space separator 100 is connected or disposed at one end of the space separator 100 immediately adjacent to the tray wall 114. When a plurality of space separators 100 are provided, considering that each space separator needs to move separately, the rotation driving device of the each space separator 100 may be disposed at one end of the each space separator 100 immediately adjacent to the tray wall 114.

The tray 110 is for disposing the space separator 100. A shape of the slot 112 provided for the tray 110 may be set according to user needs. For example, the shape of the slot 112 may be set as a square shape, a rectangular shape, a circular shape or a sector shape, etc. based on an item that needs to be circulated. The tray door 113 disposed in the slot 112 may be implemented as an openable automatic door in the prior art or a future developed technology, and the present application has no limitation thereto. For example, the openable automatic door may be implemented as a sliding door driven by the servo motor; and an openable automatic door may also be employed, which may be driven by a motor to rotate to be opened along a door axle.

Optionally, the space separator 100 may comprise a frame 101 in which a soft material and/or a hard material may be laid.

Here, the soft material may be deformed under stress and resume the unstressed shape upon offload of an external force, such that damages to the item may be avoided; the hardware material may maintain the original shape under stress, thereby maintaining the shape of the space separator unchanged before and after the stress.

Optionally, a top part of the frame is provided with a transverse beam 102; on the transverse beam 102 is disposed a driving motor; a gearwheel 103 is provided on the shaft of the driving motor; when the shaft of the driving motor drives the gearwheel 103 to rotate, the gearwheel is engaged with a gear ring 115 preset on the tray wall to drive the space separator to rotate about the shaft of the tray.

Here, the gear ring 115 preset on the tray wall may be differentiated into an inner gear ring or an outer gear ring. FIG. 1 exemplarily illustrates a scenario where the gear ring 115 is an outer gear ring, the driving motor and the gearwheel are disposed at an outer side of the tray wall, and the gearwheel moves along the outer gear ring. It should be understood that when the gear ring 115 is an inner gear ring, the driving motor and the gearwheel may be disposed at an inner side of the tray wall, and the gearwheel will move along the inner gear ring.

A driving motor is mounted on the transverse beam 102, such that when the driving motor drives the gearwheel 103 to travel along a trajectory parallel to the gear ring, the transverse beam 102 is driven to rotate about the shaft of the tray.

Optionally, the transverse beam 102 is detachably connected to the sliding beam 104; and a driving motor is mounted on the sliding beam 104.

Here, by disposing the transverse beam 102 to be detachably connected to the sliding beam 104, a position of the motor may be adjusted by adjusting the relative positions of the sliding beam 104 and the transverse beam 102, thereby adjusting the position of the motor more conveniently.

Optionally, the number of the space separators may be determined based on the number of storage bins divided by the space separators in the tray; alternatively or additionally, sizes of the storage bins divided by the plurality of space separators in the tray may be determined based on relative positions of the plurality of space separators.

Figure 2:
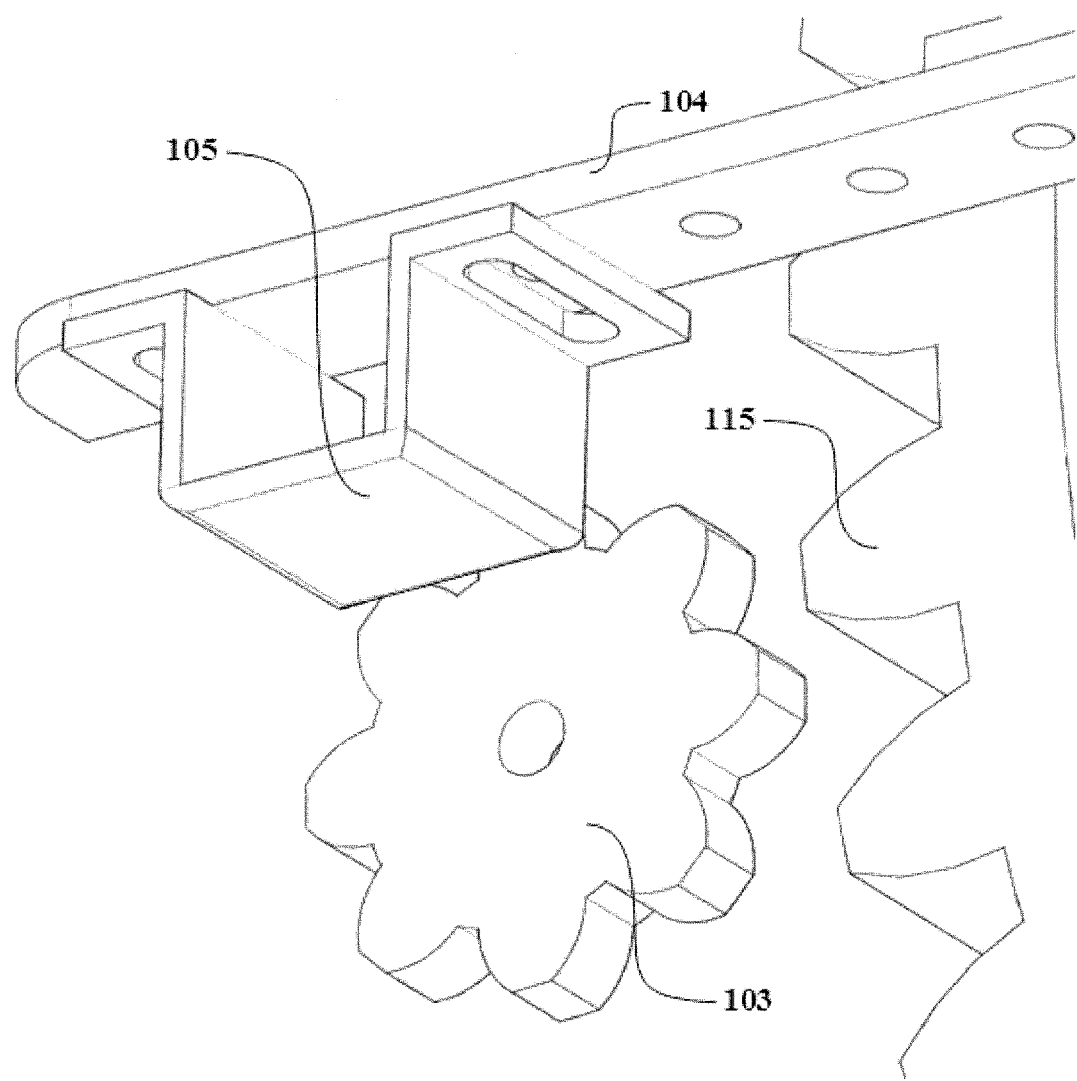
FIG. 2 is an exemplary manner of disposing a driving motor of a space separator for a sorting robot in FIG. 1 according to the embodiments of the present disclosure.

Optionally, please refer to FIG. 2, which is an exemplary manner of disposing a driving motor of a space separator for a sorting robot in FIG. 1 according to the embodiments of the present disclosure. In FIG. 2, a motor base 105 of the driving motor is detachably connected on the sliding beam 104, the motor base 105 being adjustable according to a predetermined size along a vertical direction.

In FIG. 2, a circular hole is provided on the sliding beam, and a waist-type hole is provided on the motor base; a length direction of the waist-type hole is disposed along a vertical direction; the position of the motor base may be adjusted along a vertical direction through cooperation between the waist-type hole and the circular hole to thereby adjust the position of the motor in the vertical direction.

It should be understood that the manners of adjusting the motor base according to a predetermined size along the vertical direction as shown in FIG. 1 and FIG. 2 are only specific examples of the embodiments of the present application, which do not represent limitations to the present application. For example, adjusting the motor base according to a predetermined size along the vertical direction may also be implemented by snap-fitting or sliding connection or other connection manner.

By disposing the space separator along the shaft of the tray till the tray wall, wherein the space separator may rotate about the shaft of the tray, the space separator for a sorting robot provided according to the embodiments of the present disclosure enables adjustment of the sizes of the storage bins that are divided by the space separators in the tray and adjustment of the volumes of the storage bins as well as the number of items placed in a storage bin.

Figure 3:
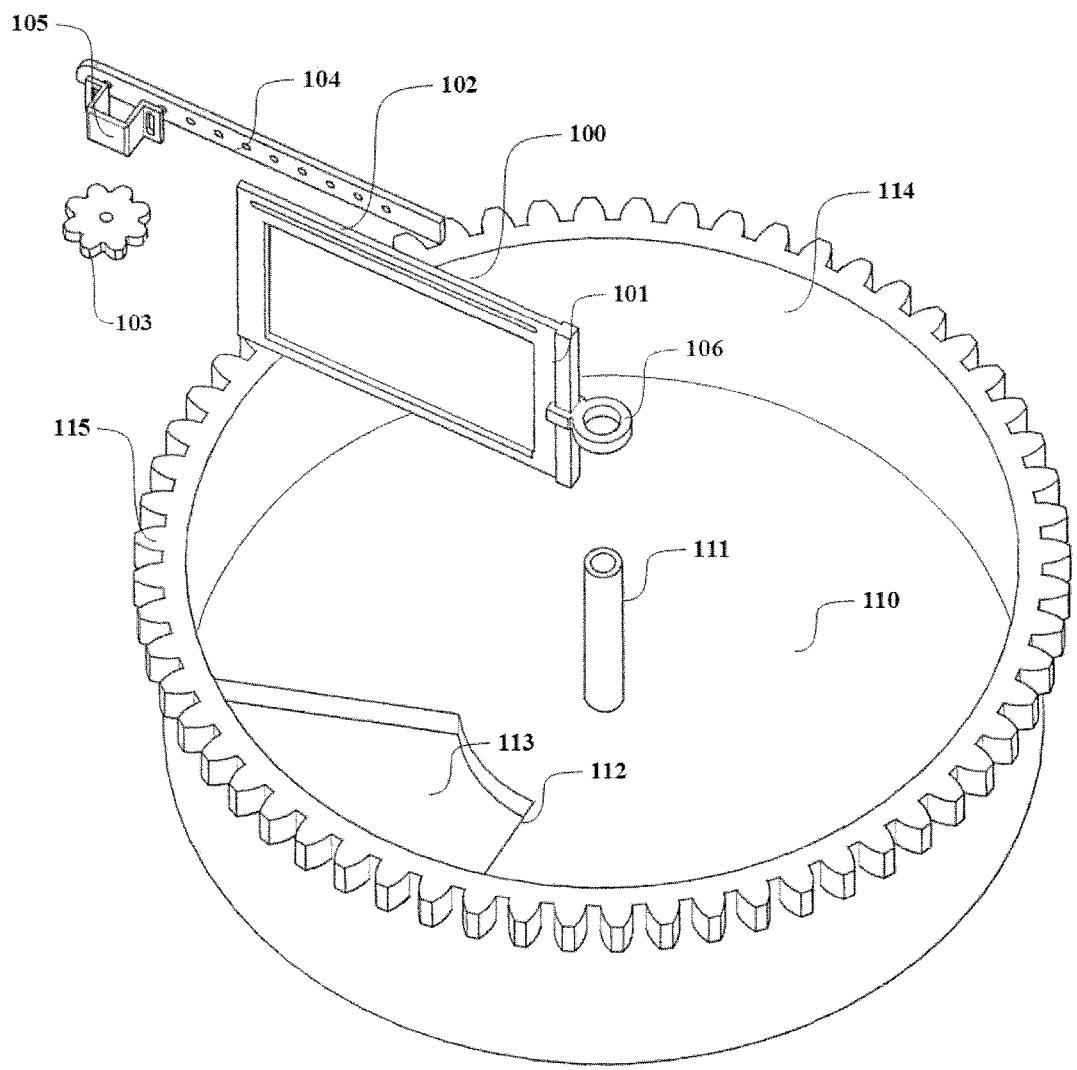
FIG. 3 is an exemplary disassembled structural diagram of the space separator for a sorting robot in FIG. 1.

Further refer to FIG. 3, which is an exemplary disassembled structural diagram of the space separator for a sorting robot in FIG. 1.

As illustrated in FIG. 3, a space separator 100 for a sorting robot is provided, wherein the sorting robot comprises: a tray 110, an axial center of the tray 110 being provided with a shaft 111, the tray being provided with a slot 112 in which an openable tray door 113 is provided, an end of the tray extending upwards to form a tray wall 114; the space separator 100 is disposed along the shaft of the tray till the tray wall, the space separator 100 being rotatable about the shaft of the tray.

In this embodiment, because FIG. 3 is a disassembled structural diagram corresponding to the assembly diagram of the embodiment in FIG. 1, the description about the space separator 100 for a sorting robot in the embodiment of FIG. 1 is likewise applicable to this embodiment, which will not be detailed here.

The structure of the space separator 100 described in FIG. 1 may be illustrated more clearly in the disassembled structural diagram of FIG. 3 below: the space separator 100 is provided with a detachable mounting ring 106 that is sleeved on the shaft of the tray. Here, the detachable mounting ring 106 is arranged to be connected with the shaft of the tray, thereby enhancing the detachable performance of the space separator.

On this basis, the space separator 100 in this embodiment may be provided in plurality, wherein positions of the mounting rings 106 of the space separators 100 are determined based on the positions where the mounting rings 106 of the plurality of space separators 100 are stacked on the shaft of the tray. This may guarantee the reasonability of the position where the mounting ring of each space separator 100 is disposed so as to prevent collision when the mounting rings of respective space separators 100 are sleeved on the shaft of the tray.

Figure 4:
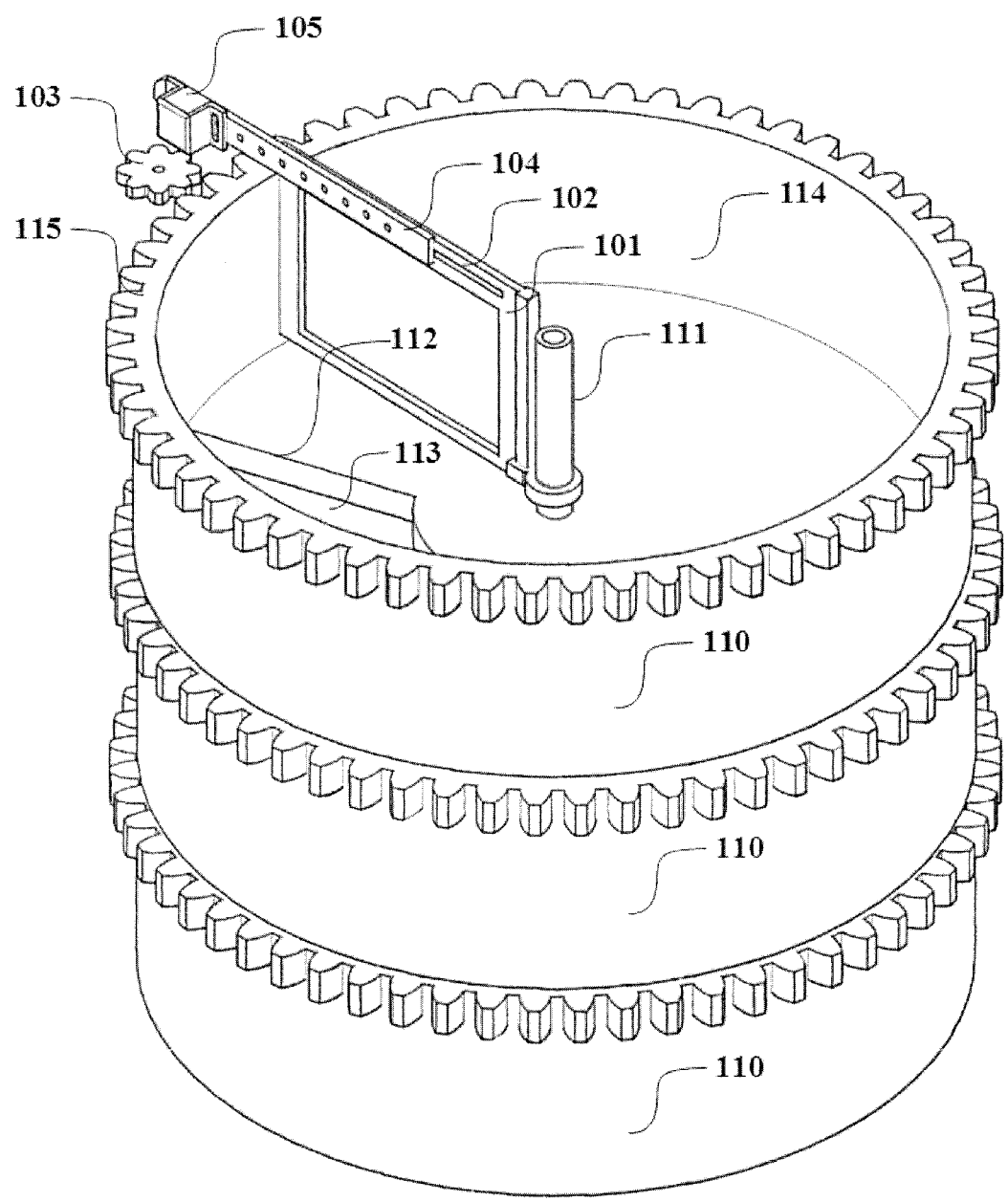
FIG. 4 is an exemplary assembly diagram of another embodiment of a space separator for a sorting robot according to the embodiments of the present disclosure.

Continue to refer to FIG. 4, which is an exemplary assembly diagram of another embodiment of a space separator for a sorting robot according to the embodiments of the present disclosure.

FIG. 4 shows a space separator 100 for a sorting robot, the robot comprises: three layers of trays 110, wherein the tray 110 at each layer comprises: a shaft 111 provided at an axial center of the tray 110, the shaft 111 of the tray being a tray servo system, a shaft of the tray servo system driving the tray to rotate about the shaft 111 of the tray; and the tray 110 is provided with a slot 112 in which an openable door 113 is provided, the openable tray door being provided with a door servo motor; the door servo motor controls an openness of the tray door; an end of the tray extends upwards to form a tray wall 114; one or more space separators 100 for partitioning storage bins is provided along the shaft 111 of the tray till the tray wall 114; the space separator 100 is provided with a driving motor; a gearwheel 103 is provided on the shaft of the driving motor; when the shaft of the driving motor drives the gearwheel 103 to rotate, the gearwheel 103 is engaged with a gear ring 115 preset on the tray wall, and the driving separator rotates about the shaft of the tray.

In this embodiment, the shaft of the tray at the top layer is connected to the shaft of the tray at the bottom layer, i.e., the shaft of the tray at the bottom layer needs to support the shaft of the tray at the top layer; therefore, a model size of the shaft of the tray at the bottom layer is usually larger than that of the shaft of the tray at the top layer, or the shaft of the tray at the bottom layer is made of a better material. The shaft of the tray at each layer may be implemented by a tray servo system, the tray being driven to rotate about the shaft of the tray via the shaft of the tray servo system.

A shape of the slot 112 provided at the tray 110 may be set according to user needs. For example, it may be set as a square shape, a rectangular shape, a circular shape, or a sector shape, etc. based on a shape of an item to be circulated by the user.

The tray door 113 provided in the slot 112 of the tray 110 may be implemented as an openable automatic door using a sliding door driven by a servo motor.

The space separator 100 that is rotatably connected on the shaft 111 of the tray 110 may be integrally or separately designed to implement a function of space partition. A driving motor or other rotation driving device may be employed to drive the space separator 100 to rotate along the shaft 111 of the tray. One or more space separators may be provided here. When the tray includes a plurality of space separators, a plurality of space separators rotates about a shaft of the tray via a mounting ring, respectively. Here, a code disc of encoder is securely coupled to a part of the each space separator rotating about the shaft of the tray, or the shaft of the driving motor may be provided with a gearwheel 103 and an encoder for obtaining the rotation angle of the gear 117.

The gear ring 115 preset on the tray wall may be differentiated into an inner gear ring or an outer gear ring. FIG. 4 exemplarily illustrates a scenario where the gear ring 115 is an outer gear ring, wherein the driving motor and the gearwheel are disposed at an outer side of the tray wall, and the gearwheel can moves along the outer gear ring. It should be understood that when the gear ring 115 is an inner gear ring, the driving motor and the gearwheel may be disposed at an inner side of the tray wall, and the gearwheel will move along the inner gear ring.

According to the space separator for a sorting robot provided according to an embodiment of the present disclosure, a driving motor may be disposed at a tray wall side of the space separator; and with a gearwheel being provided on the shaft of the driving motor, where the gearwheel may be engaged with a gear ring preset on the tray wall such that the gearwheel may be driven by the driving motor to move along the gear ring, the space separator is enabled to adjust the size of the storage bin; besides, the position corresponding to the tray door of the tray at each layer may be adjusted by the tray servo system of the tray at each layer, and then the item that needs to be outputted is pushed by the space separator of the tray at each layer to the tray door, thereby improving the efficiency of inputting or outputting the item from the tray at each layer.

Those skilled in the art may understand that to clearly embody the inventive characteristics of the present disclosure, FIGS. 1, 2, 3 and 4 in the drawings of the present disclosure are structural diagrams viewed from different perspectives, respectively.

What have been described above are only preferred embodiments of the present disclosure and an illustration of the technical principle as exerted. Those skilled in the art should understand, the scope of the invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A space separator for a sorting robot, wherein the sorting robot comprises at least one layer of trays, an axial center of each tray being provided with a shaft, each tray being provided with a slot in which an openable tray door is provided, the openable tray door being configured to move relative to the tray, block an opening in the slot when the openable tray door is closed, and expose the opening in the slot when the openable tray door is opened, an end of each tray extending upwards to form a tray wall, wherein the space separator is disposed along the shaft of the tray till the tray wall, and the space separator is rotatable about the shaft of the tray, wherein the space separator is rotatably connected to the shaft.

2. The space separator according to claim 1, wherein the space separator comprises a frame in which a soft material and/or a hard material is laid.

3. The space separator according to claim 2, wherein:
a top part of the frame is provided with a transverse beam;
a driving motor is provided on the transverse beam; and
a gearwheel is provided on the shaft of the driving motor, wherein when the shaft of the driving motor drives the gearwheel to rotate, the gearwheel is engaged with a gear ring preset on the tray wall to drive the space separator to rotate about the shaft of the tray.

4. The space separator according to claim 3, wherein the transverse beam is detachably connected to a sliding beam; and on the sliding beam is mounted a driving motor.

5. The space separator according to claim 4, wherein the sliding beam is detachably connected to a motor base of the driving motor, the motor base being adjustable according to a predetermined size along a vertical direction.

6. The space separator according to claim 1, wherein the space separator is provided with a mounting ring that is sleeved on the shaft of the tray.

7. The space separator according to claim 6, wherein the space separator is provided with a detachable mounting ring.

8. The space separator according to claim 6, wherein the space separator is provided in plurality, positions of the mounting rings of the space separators being determined based on the positions where the mounting rings of the plurality of space separators are stacked on the shaft of the tray.

9. The space separator according to claim 7, wherein the space separator is provided in plurality, positions of the mounting rings of the space separators being determined based on the positions where the mounting rings of the plurality of space separators are stacked on the shaft of the tray.

10. The space separator according to claim 1, wherein the space separator, the tray and the tray wall form a plurality of storage bins, a number of the space separators is determined based on a number of the storage bins divided by the space separators in the tray; and/or sizes of the storage bins divided by the plurality of space separators in the tray are determined based on relative positions of the plurality of space separators.

\* \* \* \* \*